(12) United States Patent
Aoki et al.

(10) Patent No.: US 6,562,429 B2
(45) Date of Patent: May 13, 2003

(54) CUSHION MATERIAL AND CUSHION LABEL

(75) Inventors: Masashige Aoki, Kumagaya (JP); Hirohumi Toda, Kumagaya (JP)

(73) Assignee: Lintec Corporation, Tokyo (JP)

( * ) Notice: Subject to any disclaimer, the term of this patent is extended or adjusted under 35 U.S.C. 154(b) by 0 days.

(21) Appl. No.: 09/864,532

(22) Filed: May 24, 2001

(65) Prior Publication Data
US 2002/0004117 A1 Jan. 10, 2002

(30) Foreign Application Priority Data

May 26, 2000 (JP) ........................................ 2000-156705
Mar. 28, 2001 (JP) ........................................ 2001-092807

(51) Int. Cl.$^7$ ................................................ G09F 3/02
(52) U.S. Cl. ........................ 428/40.1; 283/81; 428/40.9; 428/41.3; 428/41.7; 428/42.1; 428/218; 428/220
(58) Field of Search ................................ 428/40.1, 40.9, 428/41.3, 41.7, 42.1, 218, 220; 283/81

(56) References Cited

U.S. PATENT DOCUMENTS 4,342,399 A * 8/1982 Stirling ........................ 215/12

* cited by examiner

*Primary Examiner*—Nasser Ahmed
(74) *Attorney, Agent, or Firm*—Frishauf, Holtz, Goodman & Chick, P.C.

(57) ABSTRACT

A cushion material which comprises a cushion sheet having a density of 0.05 to 0.65 g/cm$^3$ and a layer for receiving prints disposed on one face of the cushion sheet; and a cushion label which comprises the above cushion material and an adhesive layer and a release material each laminated to a face of the cushion sheet opposite to the face having the layer for receiving prints.

The cushion material and the cushion label can be printed clearly with fine characters and fracture of bottles such as bottles for medicines can be effectively prevented when the cushion material or the cushion label is stuck to the bottles.

20 Claims, 2 Drawing Sheets

CUSHION MATERIAL AND CUSHION LABEL

BACKGROUND OF THE INVENTION

1. Field of the Invention

The present invention relates to a cushion material and a cushion label and, more particularly, to a cushion material and a cushion label which can be printed clearly with fine characters and can effectively prevent fracture of bottles such as bottles for medicines when the cushion material or the cushion label is stuck to the bottles.

2. Description of Related Art

Small glass bottles filled with medicines or the like are placed into boxes having partition plates such as partition plates of cardboard formed in a grid pattern to prevent fracture of bottles by collision between each other and delivered to hospitals from manufacturers of the medicines or the like. However, using the box having partition plates has a problem in that the box is expensive and that disposal of the box causes an increase in the waste material in the environment. Moreover, although the bottles are protected in the boxes having the partition plates during the delivery, the bottles are left in the naked condition after being taken out of the boxes in hospitals and it is inevitable that the bottles are possibly fractured by collision between each other.

SUMMARY OF THE INVENTION

The present invention has an object of providing a cushion material and a cushion label which can be printed clearly with fine characters and can effectively prevent fracture of bottles such as bottles for medicines when the cushion material or the cushion label is stuck to the bottles.

As the result of extensive studies by the present inventors to overcome the above problems, it was found that, when a cushion material and a cushion label comprise a cushion sheet having a density of 0.05 to 0.65 g/cm$^3$ and a layer for receiving prints disposed on one face of the cushion sheet, the cushion material and the cushion label can be printed clearly with fine characters and exhibit an excellent cushioning effect. The present invention has been completed based on the knowledge.

The present invention provides:

(1) A cushion material which comprises a cushion sheet having a density of 0.05 to 0.65 g/cm$^3$ and a layer for receiving prints disposed on one face of the cushion sheet;

(2) A cushion material described in (1), wherein the cushion sheet comprises 0 to 100% by weight of a synthetic fiber and 0 to 100% by weight of pulp;

(3) A cushion material described in (2), wherein the cushion sheet is a mixed paper comprising 20 to 85% by weight of a synthetic fiber and 15 to 80% by weight of pulp;

(4) A cushion material described in (3), wherein the synthetic fiber is a bulky yarn;

(5) A cushion material described in (4), wherein the bulky yarn is made of a polyester fiber;

(6) A cushion material described in (1), which comprises a barrier layer disposed on a face of the cushion sheet opposite to the face having the layer for receiving prints and has a stiffness of 400 mN/100 or smaller as measured in accordance with a method of TAPPI T543 pm-84;

(7) A cushion material described in (1), which comprises an under layer between the cushion sheet and the layer for receiving prints;

(8) A cushion material described in (6), wherein the barrier layer has resistance to solvents; and (9) A cushion label which comprises a cushion material described in any of (1) to (8) and an adhesive layer and a release material each laminated to a face of the cushion sheet opposite to the face having the layer for receiving prints.

BRIEF DESCRIPTION OF THE DRAWINGS

The numbers in the Figures have the following meanings:
1: A layer for receiving prints
2: A bonding layer
3: A cushion sheet
4: An adhesive layer
5: A release material
6: An under layer
7: A barrier layer

DESCRIPTION OF THE PREFERRED EMBODIMENTS

The cushion material of the present invention comprises a cushion sheet having a density of 0.05 to 0.65 g/cm$^3$ and a layer for receiving prints disposed on one face of the cushion sheet. The cushion sheet used in the present invention is not particularly limited as long as the cushion sheet exhibits the cushioning effect of relaxing impact force. Preferable examples of the cushion sheet include cushion sheets comprising synthetic fibers, cushion sheets comprising pulp, cushion sheets comprising a mixture of synthetic fibers and pulp in a desired relative amounts and cushion sheets comprising foamed plastics.

The cushion sheet used in the present invention has a density in the range of 0.05 to 0.65 g/cm$^3$, preferably in the range of 0.1 to 0.60 g/cm$^3$ and more preferably in the range of 0.15 to 0.55 g/cm$^3$. When the density is smaller than 0.05 g/cm$^3$, the cushion sheet has a small mechanical strength and there is the possibility that the property of holding the shape is poor. When the density exceeds 0.65 g/cm$^3$, there is the possibility that the cushioning property as the cushion material or the cushion label is insufficient. The density of the cushion sheet can be measured in accordance with the method of Japanese Industrial Standard P 8118. The thickness of the cushion sheet used in the present invention is not particularly limited. It is preferable that the thickness is 50 to 500 $\mu$m and more preferably 100 to 350 $\mu$m. When the thickness is smaller than 50 $\mu$m, there is the possibility that the cushioning property as the cushion material or the cushion label is insufficient. A sufficient cushioning effect can be obtained when the thickness of the cushion sheet is 500 $\mu$m or smaller and a thickness of the cushion sheet exceeding 500 $\mu$m is, in general, unnecessary. It is preferable that the cushion sheet used in the present invention has a basis weight of 30 to 300 g/m$^2$ and preferably 50 to 150 g/m$^2$. When the basis weight is smaller than 30 g/m$^2$, there is the possibility that the cushioning property as the cushion material or the cushion label is insufficient. When the basis weight exceeds 300 g/m², there is the possibility that the adhesive property is poor when the cushion material or the cushion label is stuck to a bottle such as a vial bottle.

The cushion material and the cushion label of the present invention has a layer for receiving prints on one face of the cushion sheet. By the layer for receiving prints disposed on one face of the cushion sheet, the property for printing of the cushion material and the cushion label is improved and, when the cushion material or the cushion label is used as a label of a bottle for a medicine, directions for the use printed in fine characters can be clearly read. The layer for receiving prints disposed in the cushion material of the present invention is not particularly limited. A material suitably selected from materials which can receive printing ink in the gravure printing, the offset printing, the letter press or the screen printing can be used for the layer for receiving prints.

The process for forming the layer for receiving prints is not particularly limited. For example, the layer for receiving prints may be formed by laminating paper or a film to the cushion sheet; formed on the cushion sheet by using a multi-layer paper making machine simultaneously when the cushion sheet is produced in accordance with the mixed paper making process; or formed by coating the cushion sheet with a coating liquid so that the layer for receiving prints is directly formed on the cushion sheet.

When the layer for receiving prints is formed by laminating paper or a film to the cushion sheet, the process for the lamination is not particularly limited. The lamination can be conducted by using a pressure-sensitive adhesive or an adhesive. The lamination can also be conducted by laminating a synthetic resin such as a polyethylene resin to the cushion sheet by melt extrusion, laminating paper or a film and pressing the formed laminate by a pressing roll or a cooling roll, successively. The paper used for the lamination is not particularly limited. Examples of the paper include woodfree paper, coated paper and art paper. The film used for the lamination is not particularly limited. Examples of the film include films of polyethylene resins, polypropylene resins, polyethylene terephthalate resins, ethylene-vinyl acetate copolymer resins, polyvinyl chloride resins and polyurethane resins. It is preferable that the paper used for the lamination has a basis weight in the range of 30 to 200 g/m² and more preferably in the range of 50 to 100 g/m². It is preferable that the film used for the lamination has a thickness in the range of 5 to 100 µm and more preferably in the range of 10 to 75 µm.

When the layer for receiving prints is formed on the cushion sheet by using a multi-layer paper making machine simultaneously when the cushion sheet is produced in accordance with the multiply paper making process, a plurality of paper machines of the Fourdrinier machine or the cylinder machine are used in combination. For example, a cushion sheet made by using a Fourdrinier machine is laminated with woodfree paper made by using another Fourdrinier machine.

When the layer for receiving prints is formed by coating the cushion sheet with a coating liquid so that the layer for receiving prints is directly formed on the cushion sheet, examples of a binder used for the coating liquid include polyester urethane resins, acrylic resins, urethane resins, acrylic urethane resins, styrene resins, polyester resins, polyvinyl alcohol, starch and casein. Where necessary, fillers such as clay, aluminum hydroxide, calcium carbonate and titanium oxide and crosslinking agents such as isocyanate crosslinking agents and epoxy crosslinking agents may be added to the above material. For application of the coating liquid, an air knife coater, a bar coater, a transfer roll coater or a blade coater can be used. It is preferable that the thickness of the layer for receiving prints formed by the coating is in the range of 0.01 to 50 µm and more preferably in the range of 0.05 to 30 µm.

It is preferable, that the cushion sheet used in the present invention comprises 0 to 100% by weight of a synthetic fiber and 0 to 100% by weight of pulp. It is more preferable that the cushion sheet is a mixed paper comprising 20 to 85% by weight of a synthetic fiber and 15 to 80% by weight of pulp. The material for the synthetic fiber used in the present invention is not particularly limited. Examples of the material for the synthetic fiber include nylon resins, polyester resins, acrylic resins, polyvinyl alcohol resins, polypropylene resins, polyethylene resins, polyvinyl chloride resins, polyvinylidene chloride resins, polyurethane resins, aramide resins and phenol resins. Regenerated fibers such as rayon and semi-synthetic fibers such as acetate fibers can also be used as the synthetic fiber. Among the above synthetic fibers, polyester fibers are preferably used since polyester fibers have great Young's moduli, provide excellent cushioning effects and generate smaller amounts of heat when the fibers are burned for disposal. The shape of the synthetic fiber used in the present invention is not particularly limited. For example, synthetic fibers having straight shapes, crimped shapes and coil shapes can be used.

It is preferable that the synthetic fiber used in the present invention is a bulky yarn. The bulky yarn is not particularly limited. Examples of the bulky yarn include crimped yarns, structural bulky yarns and composite yarns. The crimped yarn is obtained by deforming and heat setting a multi-filament yarn so that fibers have curved shapes. The fibers are not tightly adhered with each other and gaps are present between the fibers. Thus, the yarn becomes bulky and also flexible due to the curved shapes of the fibers. The process for forming the crimped yarn is not particularly limited. The crimped yarn can be obtained, for example, in accordance with the temporary twisting process, the pushing process, the rubbing process or the shaping process. The structural bulky yarn is obtained from a multi-filament yarn in which fibers have various lengths in a short range and an entangled structure is formed. Fine loops can be formed in the structural bulky: yarn by injection of the air. The composite yarn is obtained in a manner such that multi-filament yarns having different degree of elongation are arranged together and then temporarily twisted and individual fibers are made to have lengths different between each other. The composite yarn has both of the bulkiness of the crimped yarn and the bulkiness of the structural bulky yarn. Among these yarns, the crimped yarn can be preferably used since excellent cushioning effect can be obtained. The number of crimp in the crimped yarn is not particularly limited. It is preferable that the number of crimp is 3 crimps/25 mm or greater and more preferably in the range of 5 to 15 crimps/25 mm as measured in accordance with the method of Japanese Industrial Standard L 1015. In the present invention, the bulky yarn and a yarn not treated for bulkiness may be used in combination. The synthetic fiber may be used in combination with glass fibers, metal fibers and carbon fibers.

In the present invention, when a paper comprising a synthetic fiber and pulp is used for the cushion sheet, the length of the synthetic fiber is not particularly limited. It is preferable that the length of the synthetic fiber is in the range of 1 to 30 mm and more preferably in the range of 2 to 15 mm. When the length of the synthetic fiber is shorter than 1 mm, there is the possibility that an excellent cushioning effect is not obtained. When the length of the synthetic fiber exceeds 30 mm, there is the possibility that workability in the sheet making process deteriorates.

In the present invention, when a non-woven fabric comprising 100% of a synthetic fiber is used for the cushion sheet, any of short fibers and long fibers can be used as the synthetic fiber. The process for producing the non-woven fabric is not particularly limited. Examples of the process for producing the non-woven fabric include the wet process, the chemical bond process, the thermal bond process, the air lay process, the spun lace process, spun bond process, the melt blown process, the needle punch process and the stitch bond process.

The pulp used in the present invention is not particularly limited. Examples of the pulp include cellulose pulps and synthetic pulps. Examples of the cellulose pulp include cellulose pulps derived from fibers of plants such as needle-leaf trees, broadleaf trees, bamboo, straw, hemp, bagasse and cotton and recycled pulp obtained from used paper. The type of the pulp include mechanical pulps such as groundwood pulp, refiner groundwood pulp, thermomechanical pulp and chemithermomechanical pulp and chemical pulps such as sulfite pulp, kraft pulp, soda pulp and organosolve pulp. Examples of the synthetic pulp include polyethylene pulp and polypropylene pulp.

In the present invention, the process for producing the paper comprising a synthetic fiber and pulp is not particularly limited. For example, a synthetic fiber and a pulp are added to water and a slurry is formed. A stock is prepared by adding binders, sizing agents, wet strength improvers, defoaming agents, fillers and agents for adjusting pH, where necessary, and paper is produced by using a paper making machine of the wet type. Examples of the binder include acrylic resins, styrene resins, polyvinyl alcohol resins, polyvinyl acetate resins and polyvinyl chloride resins. Examples of the sizing agent include rosin resins, petroleum resins, styrene-acrylic resins, alkylketene dimers and alkenylsuccinic anhydrides. Examples of the wet strength improver include starch, carboxymethylcellulose, polyvinyl alcohol, urea-formaldehyde resins, melamine-formaldehyde resins, polyamide-urea-formaldehyde resins, ketone resins, polyamide-epichlorohydrin resins and polyethyleneimine resins. Examples of the filler include mineral fillers such as talc, clay, diatomaceous earth, calcium carbonate, magnesium carbonate, aluminum hydroxide, titanium oxide, magnesium sulfate, silica, aluminosilicates and bentonite and organic synthetic fillers such as polystyrene particles and urea-formaline resin particles.

The cushion sheet used in the present invention may be subjected to the supercalender treatment. By the supercalender treatment of the cushion sheet, flexibility is enhanced and smoothness is improved.

It is preferable that the cushion material of the present invention comprises a barrier layer disposed on the face of the cushion sheet opposite to the face having the layer for receiving prints and the cushion material has a stiffness of 400 mN/100 or smaller and more preferably 300 mN/100 or smaller as measured in accordance with the method of TAPPI T543 pm-84.

In the present invention, the material for the barrier layer which is disposed on the face of the cushion sheet opposite to the face having the layer for receiving prints is not particularly limited. Examples of the material for the barrier layer include polyethylene resins, polypropylene resins, polyurethane resins, acrylic resins and styrene-butadiene copolymer resins. In the present invention, it is preferable that the barrier layer has resistance to solvents so that stable adhesion can be achieved by coating the cushion material with an adhesive containing solvents. The resistance to solvents can be evaluated by coating the barrier layer with a toluene solution containing an oil-based ink and observing penetration of the ink into the face having the layer for receiving prints. In general, the resistance to solvents can be evaluated as good when the number of the portion having, penetration of the ink is 5 or less in an area of 30 cm×30 cm. The thickness of the barrier layer is not particularly limited. It is preferable that the thickness of the barrier layer is in the range of 5 to 50 $\mu$m and more preferably in the range of 10 to 30 $\mu$m.

When the stiffness as measured in accordance with the method of TAPPI T543 pm-84 is 400 mN/100 or smaller, a cushion label obtained by laminating an adhesive layer and a release material to the cushion material can be stuck with stability to a bottle for medicines and the like without lifting or peeling from the bottle.

In the cushion material of the present invention, an under layer may be disposed between the cushion sheet and the layer for receiving prints. By disposing the under layer, the smoothness of the layer for receiving prints can be improved even when the surface of the cushion sheet has protrusions, depressions and undulations. The cushion material can be colored by adding pigments into the under layer so that printed characters and figures can be read easily. The resin for forming the under layer is not particularly limited and the same resins as the resins used for the barrier layer can be used. The pigment added into the under layer is not particularly limited. Examples of the pigment include inorganic pigments such as titanium oxide, chrome yellow, molybdate orange, iron oxide red, iron oxide purple, Prussian blue, chrome green and carbon black and organic pigments such as Hanza yellow, Orange II lake, lake red, quinacridone violet, indanthrone blue and copper phthalocyanine chloride. Among these pigments, it is advantageous in many cases that titanium oxide is used so that a cushion material having a white surface is prepared. In the present invention, the thickness of the under layer is not particularly limited. It is preferable that the thickness of the under layer is in the range of 10 to 100 $\mu$m and more preferably in the range of 30 to 80 $\mu$m.

Figure 1:
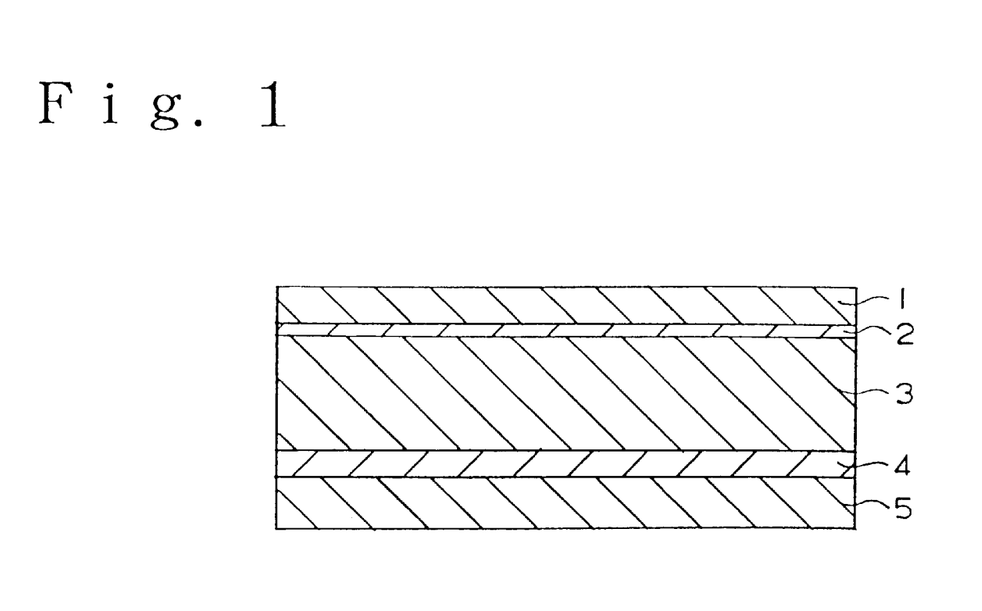
FIG. 1 shows a schematic sectional view of an embodiment of the cushion label of the present invention.

The cushion label of the present invention comprises a cushion material of the present invention and an adhesive layer and a release material each laminated to a face opposite to the face having the layer for receiving prints. FIG. 1 shows a schematic sectional view of an embodiment of the cushion label of the present invention. In the cushion label of the present embodiment, a layer for receiving prints 1, a bonding layer 2 for laminating the layer for receiving prints and a cushion sheet, a cushion sheet 3, an adhesive layer 4 and a release material 5 are disposed in this order. The process for producing the cushion label of the present embodiment is not particularly limited. For example, the cushion label can be produced by forming a cushion material by laminating the layer for receiving prints and the cushion sheet by extrusion lamination of polyethylene, followed by laminating the release material having the adhesive layer to the cushion sheet in the cushion material. Alternatively, the cushion label can be produced by forming the adhesive layer by coating the cushion sheet in the cushion material formed above with an adhesive, followed by laminating the release material.

Figure 2:
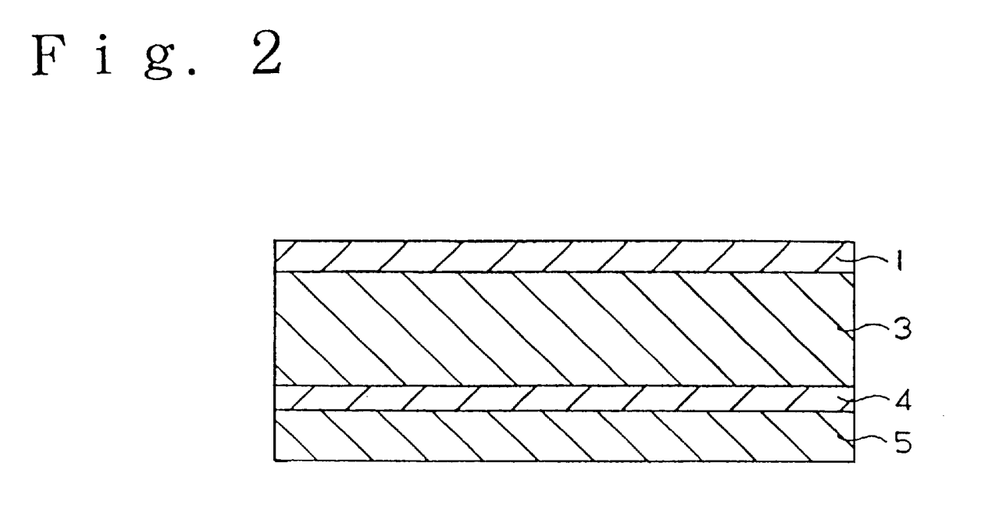
FIG. 2 shows a schematic sectional view of another embodiment of the cushion label of the present invention.

FIG. 2 shows a schematic sectional view of another embodiment of the cushion label of the present invention. In the cushion label of the present embodiment, a coating layer comprising a pigment is directly formed as the layer for receiving prints 1 on a cushion sheet 3.

Figure 3:
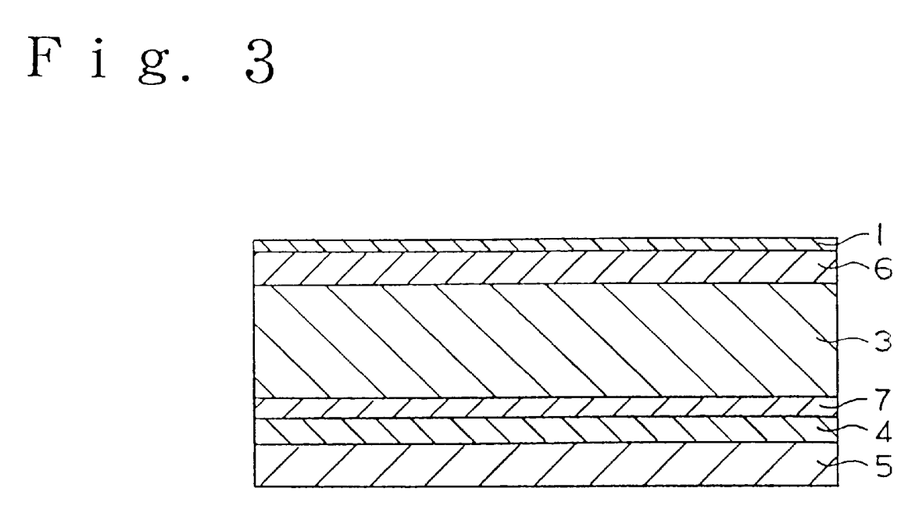
FIG. 3 shows a schematic sectional view of another embodiment of the cushion label of the present invention.

FIG. 3 shows a schematic sectional view of still another embodiment of the cushion label of the present invention. In the cushion label of the present embodiment, a layer for receiving prints 1, an under layer 6, a cushion sheet 3, a barrier layer 7, an adhesive layer 4 and a release material 5 are disposed in this order.

In the present invention, the adhesive for forming the adhesive layer 4 is not particularly limited. For example, a pressure-sensitive adhesive or a heat-sensitive adhesive may be used. Examples of the pressure-sensitive adhesive include acrylic pressure-sensitive adhesives, rubber pressure-sensitive adhesives and silicone pressure-sensitive adhesives. The thickness of the adhesive layer is not particularly limited. It is preferable that the thickness is in the range of 5 to 100 $\mu$m and more preferably in the range of 10 to 50 $\mu$m. The release material is not particularly limited. For example, paper or film coated with a release agent of a silicone resin on one face can be used.

The process for producing the cushion material of the embodiment shown by FIG. 3 is not particularly limited. For example, the cushion material can be produced by forming a barrier layer 7 on one face of a cushion sheet 3, forming an under layer 6 on the other face of the cushion sheet 3, coating the under layer 6 with a solution containing a resin having the property of receiving prints, and drying the coating layer to form a layer for receiving prints 1, successively. The cushion material can also be produced in steps in a different order, i.e., by forming an under layer 6 on one face of a cushion sheet 3, forming a layer for receiving prints 1 on the formed under layer 6, and forming a barrier layer 7, successively. The cushion material can be produced in steps in a still different order, i.e., by forming an under layer 6, a barrier layer 7 and a layer for receiving prints 1, successively.

The process for producing the cushion label of the embodiment shown by FIG. 3 is not particularly limited. For example, the cushion label can be produced by forming an adhesive layer 4 by coating the barrier layer 7 in the cushion material with an adhesive, followed by laminating a release material 5 to the adhesive layer in a manner such that a face treated with a release agent contacts the adhesive layer. The cushion label can also be produced by forming an adhesive layer 4 by coating a face of the release material 5 treated with a release agent with an adhesive to form an adhesive sheet, followed by laminating the barrier layer 7 in the cushion material with the adhesive layer 4 of the adhesive sheet.

As the coating process for forming the barrier layer 7, the layer for receiving prints 1, the under layer 6 and the adhesive layer 4, a process can be suitably selected from conventional processes such as the extrusion coating process, the roll coating process, the roll knife coating process, the spray coating process, the blade coating process, the air knife coating process and the gravure coating process.

The cushion material of the present invention has excellent flexibility, smoothness and solvent resistance and exhibits excellent workability. The cushion label of the present invention which is obtained from the above cushion material can be printed clearly with fine characters, has stable adhesive ability, does not cause lifting or peeling from bottles when the label is stuck to bottles for medicines or the like and can effectively prevent fracture of the bottles.

The cushion label of the present invention exhibits a great cushioning effect and bottles for medicines or the like can be delivered in containers for bottles for medicines having no partition plates without fracture when the cushion label is stuck to the bottles.

To summarize the advantages of the invention, the cushion label of the present invention can be printed clearly with fine characters, exhibits an excellent cushioning effect and bottles for medicines or the like can be delivered in containers having no partition plates without fracture when the cushion label is stuck to the bottles.

EXAMPLES

The present invention will be described more specifically with reference to examples in the following. However, the present invention is not limited to the examples.

In Examples and Comparative Examples, the density of a cushion sheet was measured in accordance with the method of Japanese Industrial Standard P 8118 and the stiffness of a cushion material was measured in accordance with the method of TAPPI T543 pm-84 using a flexibility tester of the Gurley type.

Example 1

Bleached kraft pulp of needle-leaved trees (NBKP) in an amount of 78 parts by weight and 22 parts by weight of a crimped polyester fiber [manufactured by KURARAY Co., Ltd.; obtained by cutting EPTC 203 to a length of 5 mm; the number of crimp: 11/25 mm] were placed into water. The obtained mixture was stirred and a slurry containing 0.3% by weight of the solid substances was prepared. To 100 parts by weight of the solid of the prepared slurry which was kept being stirred, 5 parts by weight of a polyvinyl alcohol resin binder [manufactured by KURARAY Co., Ltd.; VINYLON binder fiber VPB 105-1], 0.5 parts by weight of an aqueous varnish of a styrene-acrylic resin [manufactured by SEIKO CHEMICAL INDUSTRIES Co., Ltd.; PEARLGUM CS] as the sizing agent and 1.0 part by weight of a polyamide-epichlorohydrin resin [manufactured by JAPAN PMC Corporation; WS-570] as the wet strength improver were added. Using the obtained slurry as the stock, paper was made and dried under heating by a rotary drier [manufactured by KUMAGAI RIKI KOGYO Co., Ltd.] and a cushion sheet having a basis weight of 65 g/m$^2$, a thickness of 185 $\mu$m and a density of 0.35 g/cm$^3$ was obtained.

To the above cushion sheet, a low density polyethylene [manufactured by ASAHI CHEMICAL INDUSTRY Co. Ltd.; LS2340S] was laminated by hot melt extrusion at 320° C. and a resin layer having a thickness of 16 $\mu$m was formed. While the above resin layer was formed, an art paper [manufactured by NIPPON KAKOH SEISHI K. K.; NK ART PAPER; the basis weight: 84.9 g/m$^2$] was laminated as the layer for receiving prints and a cushion material was prepared.

A release paper [manufactured by LINTEC Corporation; SP-8K BLUE], which was prepared by coating one face of glassine paper with a release agent of a silicone resin and had a thickness of 72 $\mu$m, was coated with an acrylic adhesive [manufactured by LINTEC Corporation; PA-T1] on the face having the release agent. The acrylic adhesive was dried and an adhesive sheet having an adhesive layer having a thickness of 25 $\mu$m was prepared. The prepared adhesive sheet and the cushion material were laminated together in a manner such that the adhesive layer and the cushion sheet contact each other and a cushion label was obtained.

The obtained cushion label was printed with characters by a label printer [manufactured by LINTEC Corporation; LPM-300] using types of 6 points. All characters could be read clearly.

The above cushion label was cut into labels of 25 mm×90 mm. Each label was stuck to a vial bottle having a height of 60 mm and a diameter of 30 mm in a manner such that the label was placed around approximately the entire circumference of the trunk portion of the bottle. One hundred bottles prepared as described above were packed into a cardboard box in an array of 10×10. The cardboard box was then shaken by a shaker [manufactured by SHIBATA KAGAKUKIKAI KOGYO Co., Ltd.; CMS-10 type] at an amplitude of 25 mm and a frequency of 200 shakes/minute for 24 hours. No fractured vial bottles were found.

Example 2

Bleached kraft pulp of needle-leaved trees (NBKP) in an amount of 22 parts by weight and 78 parts by weight of a crimped polyester fiber [manufactured by KURARAY Co., Ltd.; obtained by cutting EPTC 203 to a length of 5 mm; the number of crimp: 11/25 mm] were placed into water. The obtained mixture was stirred and a slurry containing 0.3% by weight of the solid substances was prepared. To 100 parts by weight of the solild of the prepared slurry which was kept being stirred, 5 parts by weight of a polyvinyl alcohol resin binder [manufactured by KURARAY Co., Ltd.; VINYLON binder fiber VPB 105-1], 0.5 parts by weight of an aqueous varnish of a styrene-acrylic resin [manufactured by SEIKO CHEMICAL INDUSTRIES Co., Ltd.; PEARLGUM CS] as the sizing agent and 1.0 part by weight of a polyamide-epichlorohydrin resin [manufactured by JAPAN PMC Corporation; WS-570] as the wet, strength improver were added. Using the obtained slurry as the stock, paper was made and dried under heating by a rotary drier [manufactured by KUMAGAI RIKI KOGYO Co., Ltd.] and a cushion sheet having a basis weight of 65 g/m$^2$ and a density of 0.18 g/cm$^3$ was obtained.

To the above cushion sheet, a low density polyethylene [manufactured by ASAHI CHEMICAL INDUSTRY Co. Ltd.; LS2340S] was laminated by hot melt extrusion at 320° C. and a resin layer having a thickness of 16 $\mu$m was formed. While the above resin layer was formed, an art paper [manufactured by NIPPON KAKOH SEISHI K. K.; NK ART PAPER; the basis weight: 84.9 g/m$^2$] was laminated as the layer for receiving prints and a cushion material was prepared. An adhesive sheet prepared in accordance with the same procedures as those conducted in Example 1 and the cushion material were laminated together in a manner such that the adhesive layer and the cushion sheet contact each other and a cushion label was obtained.

The obtained cushion label was evaluated in accordance with the same procedures as those conducted in Example 1. In the printing using types of 6 points, all characters could be clearly read. In the shaking test of 100 vial bottles stuck with the cushion label, no fractured vial bottles were found.

Example 3

Bleached kraft pulp of needle-leaved trees (NBKP) in an amount of 33 parts by weight and 67 parts by weight of a phenolic resin fiber [manufactured by GUNEI CHEMICAL INDUSTRY Co., Ltd.; obtained by cutting KYNOL KF-0206 to a length of 6 mm] were placed into water. The obtained mixture was stirred and a slurry containing 0.3% by weight of the solid substances was prepared. To 100 parts by weight of the solid of the prepared slurry which was kept being stirred, 10 parts by weight of a polyvinyl alcohol resin binder [manufactured by KURARAY Co., Ltd.; VINYLON binder fiber VPB 105-1], 0.5 parts by weight of an aqueous varnish of a styrene-acrylic resin [manufactured by SEIKO CHEMICAL INDUSTRIES Co., Ltd.; PEARLGUM CS] as the sizing agent and 1.0 part by weight of a polyamide-epichlorohydrin resin [manufactured by JAPAN PMC Corporation; WS-570] as the wet strength improver were added. Using the obtained slurry as the stock, paper was made and dried under heating by a rotary drier [manufactured by KUMAGAI RIKI KOGYO Co., Ltd.] and a cushion sheet having a basis weight of 65 g/m$^2$ and a density of 0.15 g/cm$^3$ was obtained.

To the above cushion sheet, a low density polyethylene [manufactured by ASAHI CHEMICAL INDUSTRY Co. Ltd.; LS2340S] was laminated by hot melt extrusion at 320° C. and a resin layer having a thickness of 16 $\mu$m was formed. While the above resin layer was formed, an art paper [manufactured by NIPPON KAKOH SEISHI K. K.; NK ART PAPER; the basis weight: 84.9 g/m$^2$] was laminated as the layer for receiving prints and a cushion material was prepared. An adhesive sheet prepared in accordance with the same procedures as those conducted in Example 1 and the cushion material were laminated together in a manner such that the adhesive layer and the cushion sheet contact each other and a cushion label was obtained.

The obtained cushion label was evaluated in accordance with the same procedures as those conducted in Example 1. In the printing using types of 6 points, all characters could be clearly read. In the shaking test of 100 vial bottles stuck with the cushion label, no fractured vial bottles were found.

Example 4

The cushion sheet obtained in Example 2 which had a basis weight of 65 g/m$^2$ and a density of 0.18 g/cm$^3$ was coated with a clay coating liquid, which contained 65 parts by weight of clay [manufactured by ENGELHARD Corporation; UW-90], 18 parts by weight of calcium carbonate [manufactured by OKUTAMA KOGYO Co., Ltd.; TAMA PEARL 222H], 5 parts by weight of oxidized starch [manufactured by OJI CORN STARCH Co., Ltd.; OJI ACE A] and 12 parts by weight of a styrene-butadiene latex [manufactured by JSR Corporation; 0669] in water and had a content of the solid substances of 50% by weight, by a Mayer bar in an amount such that a layer having a thickness of 15 $\mu$m was formed after being dried. The coated cushion sheet was dried by a heated air oven of the air circulation type [manufactured by TABAI ESPEC Corporation; PERFECT OVEN PH-5200] at 120° C. for 1 minute and a cushion material having a layer for receiving prints was obtained. An adhesive sheet prepared in accordance with the same procedures as those conducted in Example 1 and the cushion material were laminated together in a manner such that the adhesive layer and the cushion sheet contact each other and a cushion label was obtained.

The obtained cushion label was evaluated in accordance with the same procedures as those conducted in Example 1. In the printing using types of 6 points, all characters could be clearly read. In the shaking test of 100 vial bottles stuck with the cushion label, no fractured vial bottles were found.

Example 5

A polyester fiber [manufactured by KURARAY Co., Ltd.; obtained by cutting EP 133 to a length of 10 mm] was placed into water. The obtained mixture was stirred and a slurry containing 0.3% by weight of the solid substance was prepared. To 100 parts by weight of the solid of the prepared slurry which was kept being stirred, 5 parts by weight of a polyvinyl alcohol resin binder [manufactured by KURARAY Co., Ltd.; VINYLON binder fiber VPB 105-1], 0.5 parts by weight of an aqueous varnish of a styrene-acrylic resin [manufactured by SEIKO CHEMICAL INDUSTRIES Co., Ltd.; PEARLGUM CS] as the sizing agent and 1.0 part by weight of a polyamide-epichlorohydrin resin [manufactured by JAPAN PMC Corporation; WS-570] as the wet strength improver were added. Using the obtained slurry as the stock, paper was made and dried under heating by a rotary drier [manufactured by KUMAGAI RIKI KOGYO Co., Ltd.] and a cushion sheet having a basis weight of 65 g/m$^2$ and a density of 0.12 g/cm$^3$ was obtained.

To the above cushion sheet, a low density polyethylene [manufactured by ASAHI CHEMICAL INDUSTRY Co. Ltd.; LS2340S] was laminated by hot melt extrusion at 320° C. and a resin layer having a thickness of 16 μm was formed. While the above resin layer was formed, an art paper [manufactured by NIPPON KAKOH SEISHI K. K.; NK ART PAPER; the basis weight: 84.9 g/m$^2$] was laminated as the layer for receiving prints and a cushion material was prepared. An adhesive sheet prepared in accordance with the same procedures as those conducted in Example 1 and the cushion material were laminated together in a manner such that the adhesive layer and the cushion sheet contact each other and a cushion label was obtained.

The obtained cushion label was evaluated in accordance with the same procedures as those conducted in Example 1. In the printing using types of 6 points, all characters could be clearly read. In the shaking test of 100 vial bottles stuck with the cushion label, no fractured vial bottles were found.

Comparative Example 1

Bleached kraft pulp of needle-leaved trees (NBKP) was placed into water. The obtained mixture was stirred and a slurry containing 0.5% by weight of the solid substance was prepared. To 100 parts by weight of the solid of the prepared slurry which was kept being stirred, 0.5 parts by weight of an aqueous varnish of a styrene-acrylic resin [manufactured by SEIKO CHEMICAL INDUSTRIES Co., Ltd.; PEARL-GUM CS] as the sizing agent and 1.0 part by weight of a polyamide-epichlorohydrin resin [manufactured by JAPAN PMC Corporation; WS-570] as the wet strength improver were added. Using the obtained slurry as the stock, paper was made and dried under heating by a rotary drier [manufactured by KUMAGAI RIKI KOGYO Co., Ltd.] and a cushion sheet having a basis weight of 65 g/m$^2$ and a density of 0.70 g/cm$^3$ was obtained.

To the above cushion sheet, a low density polyethylene [manufactured by ASAHI CHEMICAL INDUSTRY Co. Ltd.; LS2340S] was laminated by hot melt extrusion at 320° C. and a resin layer having a thickness of 16 μm was formed. While the above resin layer was formed, an art paper [manufactured by NIPPON KAKOH SEISHI K. K.; NK ART PAPER; the basis weight: 84.9 g/m$^2$] was laminated as the layer for receiving prints. An adhesive sheet prepared in accordance with the same procedures as those conducted in Example 1 and the material prepared above were laminated together in a manner such that the adhesive layer and the cushion sheet contact each other and a label was obtained.

The obtained label was evaluated in accordance with the same procedures as those conducted in Example 1. In the printing using types of 6 points, all characters could be clearly read. In the shaking test of 100 vial bottles stuck with the cushion label, 7 fractured vial bottles were found. Thus, it was found that the above label exhibited a poor cushioning effect.

The results of Examples 1 to 5 and Comparative Example 1 are shown in Table 1.

TABLE 1

| | Cushion sheet | | Cushion label | | |
| | material | density (g/cm$^3$) | Layer for receiving prints | clearness of character | number of fractured bottles |
| --- | --- | --- | --- | --- | --- |
| Example 1 | pulp (NBKP) polyester fiber | 0.35 | art paper | clear | 0 |
| Example 2 | pulp (NBKP) polyester fiber | 0.18 | art paper | clear | 0 |
| Example 3 | pulp (NBKP) phenol resin fiber | 0.15 | art paper | clear | 0 |
| Example 4 | pulp (NBKP) polyester fiber | 0.18 | clay coat | clear | 0 |
| Example 5 | polyester fiber | 0.12 | art paper | clear | 0 |
| Comparative Example 1 | pulp (NBKP) | 0.70 | art paper | clear | 7 |

As shown in Table 1, in Example 1 to 5 in which cushion labels prepared by using cushion sheets having a density of 0.12 to 0.35 g/cm$^3$ were stuck to vial bottles, no vial bottles were fractured in the shaking test and it was shown that the cushion labels exhibited excellent cushioning effects. In contrast, in Comparative Example 1 in which a cushion sheet having a density of 0.70 g/cm$^3$ was used, 7 out of 100 vial bottles were fractured in the shaking test and it was shown that the cushion label exhibited an inferior cushioning effect.

Example 6

Bleached kraft pulp of needle-leaved trees (NBKP) in an amount of 70 parts by weight and 30 parts by weight of bleached kraft pulp of broad-leaved trees (LBKP) were placed into water. The obtained mixture was stirred and a slurry containing 0.5% by weight of the solid substances was prepared. To 100 parts by weight of the solid of the prepared slurry which was kept being stirred, 0.5 parts by weight of an aqueous varnish of a styrene-acrylic resin [manufactured by SEIKO CHEMICAL INDUSTRIES Co., Ltd.; PEARL-GUM CS] as the sizing agent and 1.0 part by weight of a polyamide-epichlorohydrin resin [manufactured by JAPAN PMC Corporation; WS-570] as the wet strength improver were added. Using the obtained slurry as the stock, paper was made and dried under heating by a rotary drier [manufactured by KUMAGAI RIKI KOGYO Co., Ltd.] and a cushion sheet having a basis weight of 80 g/m$^2$, a thickness of 145 μm and a density of 0.55 g/cm$^3$ was obtained.

The surface (the felt surface) of the cushion sheet obtained above was coated with a clay coating liquid, which contained 65 parts by weight of clay [manufactured by ENGELHARD Corporation; UW-90], 18 parts by weight of calcium carbonate [manufactured by OKUTAMA KOGYO Co., Ltd.; TAMA PEARL 222H], 5 parts by weight of oxidized starch [manufactured by OJI CORN STARCH Co., Ltd.; OJI ACE A] and 12 parts by weight of a styrene-butadiene latex [manufactured by JSR Corporation; 0669] in water and had a content of the solid substances of 50% by weight, by a Mayer bar in an amount such that a layer having a thickness of 15 μm was formed after being dried. The coated cushion sheet was dried by a heated air oven of the air circulation type [manufactured by TABAI ESPEC Corporation; PERFECT OVEN PH-5200] at 120° C. for 1 minute and a layer for receiving prints was formed.

To the face of the above cushion sheet different from the face having the layer for receiving prints, a low density polyethylene (using pellets as the raw material) [manufactured by ASAHI CHEMICAL INDUSTRY Co. Ltd.; LS2340S] was laminated by hot melt extrusion at 320° C. and a barrier layer having a thickness of 20 μm was formed and a cushion material was prepared. The stiffness of the cushion material was 254 mN/100.

The cushion material was cut to a size of 30 cm×30 cm and placed on a smooth testing plate in a manner such that the layer for receiving prints was placed downward. The barrier layer of the cushion material was coated with a solution prepared by adding 1 part by weight of a supplement oil-based ink for a marking pen [manufactured by TERANISHI KAGAKU KOGYO Co., Ltd.; RED T-2] into 5 parts by weight of toluene using a cloth. Penetration of the ink through the cushion sheet was examined by visual observation after 5 minutes. No penetration of the ink was found.

A release paper [manufactured by LINTEC Corporation; SP-8K BLUE], which was prepared by coating one face of glassine paper with a release agent of a silicone resin and had a thickness of 72 μm, was coated with an acrylic adhesive [manufactured by LINTEC Corporation; PA-T1] on the face having the release agent. The acrylic adhesive was dried and an adhesive sheet having an adhesive layer having a thickness of 25 μm was prepared. The prepared adhesive sheet and the cushion material were laminated together in a manner such that the adhesive layer and the barrier layer of the cushion sheet contact each other and a cushion label was obtained.

After the cushion label was kept in an atmosphere of a temperature of 60° C. and a relative humidity of 95% for 3 days, the adhesive strength of the cushion label under 180 degree peeling was measured in accordance with the method of Japanese Industrial Standard Z 0237 using a SUS304 stainless steel plate finished to a mirror surface as the testing plate. The measurement was repeated 12 times. The average adhesive strength obtained from the 12 measurements was 12 N/25 mm and the standard deviation was 2 N/25 mm.

The obtained cushion label was printed with characters by a label printer [manufactured by LINTEC Corporation; LPM-300] using types of 6 points. All characters could be read clearly.

The above cushion label was cut into labels of 25 mm×90 mm. Each label was stuck to a vial bottle having a height of 60 mm and a diameter of 30 mm in a manner such that the label was placed around approximately the entire circumference of the trunk portion of the bottle. One hundred bottles prepared as described above were packed into a cardboard box in an array of 10×10. The cardboard box was then shaken by a shaker [manufactured by SHIBATA KAGAKUKIKAI KOGYO Co., Ltd.; CMS-10 type] at an amplitude of 25 mm and a frequency of 200 shakes/minute for 24 hours. No fractured vial bottles were found. No lifting or peeling of the label from the vial bottle was found.

Example 7

Bleached kraft pulp of needle-leaved trees (NBKP) in an amount of 40 parts by weight and 60 parts by weight of a crimped polyester fiber [manufactured by KURARAY Co., Ltd.; obtained by cutting EPTC 203 to a length of 5 mm; the number of crimp: 11/25 mm] were placed into water. The obtained mixture was stirred and a slurry containing 0.3% by weight of the solid substances was prepared. To 100 parts by weight of the solid of the prepared slurry which was kept being stirred, 9 parts by weight of a polyvinyl alcohol resin binder [manufactured by KURARAY Co., Ltd.; VINYLON binder fiber VPB 105-1], 0.5 parts by weight of an aqueous varnish of a styrene-acrylic resin [manufactured by SEIKO CHEMICAL INDUSTRIES Co., Ltd.; PEARLGUM CS] as the sizing agent and 1.0 part by weight of a polyamide-epichlorohydrin resin [manufactured by JAPAN PMC Corporation; WS-570] as the wet strength improver were added. Using the obtained slurry as the stock, paper was made and dried under heating by a rotary drier [manufactured by KUMAGAI RIKI KOGYO Co., Ltd.] and a cushion sheet having a basis weight of 80 g/m², a thickness of 290 μm and a density of 0.28 g/cm³ was obtained.

To one face of the above cushion sheet, a low density polyethylene (using pellets as the raw material) [manufactured by ASAHI CHEMICAL INDUSTRY Co. Ltd.; LS2340S] was laminated by hot melt extrusion at 320° C. and a layer of the polyethylene resin having a thickness of 20 μm was formed as the barrier layer.

To the other face of the cushion sheet, a mixture of 70 parts by weight of a low density polyethylene (using pellets as the raw material) [manufactured by ASAHI CHEMICAL INDUSTRY Co. Ltd.; LS2340S] and 30 parts by weight of a master batch (in the form of pellets of a polyethylene resin) containing 50% by weight of titanium oxide was laminated by hot melt extrusion at 320° C. and an under layer containing 15% by weight of titanium oxide and having a thickness of 50 μm was formed.

The formed under layer was coated with a solution prepared from 100 parts by weight of a polyester urethane resin having a glass transition temperature of 40° C., 5 parts by weight of an isocyanate crosslinking agent, 2 parts by weight of dibutyltin dilaurate and 1,500 parts by weight of toluene by a gravure coater in an amount such that a film having 0.1 μm was formed after being dried. Thus, a layer for receiving prints was formed and a cushion material was obtained.

Using the obtained cushion material, a cushion label was prepared and evaluated in accordance with the same procedures as those conducted in Example 6.

Example 8

The cushion sheet having a basis weight of 80 g/m² and a thickness of 290 μm which was obtained in Example 7 was subjected to the supercalender treatment under a linear pressure of 1,470 N/cm and a cushion sheet having a thickness of 160 μm and a density of 0.50 g/cm³ was obtained. A barrier layer was formed on one face of the obtained cushion sheet and then an under layer and a layer for receiving prints were formed on the other face of the cushion sheet, successively. Thus, a cushion material was obtained.

Using the obtained cushion material, a cushion label was prepared and evaluated in accordance with the same procedures as those conducted in Example 6.

Comparative Example 2

Bleached kraft pulp of needle-leaved trees (NBKP) was placed into water. The obtained mixture was stirred, and a slurry containing 0.5% by weight of the solid substance was prepared. To 100 parts by weight of the solid of the prepared slurry which was kept being stirred, 0.5 parts by weight of an aqueous varnish of a styrene-acrylic resin [manufactured by SEIKO CHEMICAL INDUSTRIES Co., Ltd.; PEARL-GUM CS] as the sizing agent and 1.0 part by weight of a polyamide-epichlorohydrin resin [manufactured by JAPAN PMC Corporation; WS-570] as the wet strength improver were added. Using the obtained slurry as the stock, paper was made and dried under heating by a rotary drier [manufactured by KUMAGAI RIKI KOGYO Co., Ltd.] and a cushion sheet having a basis weight of 65 g/m$^2$, a thickness of 93 μm and a density of 0.70 g/cm$^3$ was obtained.

A cushion material and a cushion label were prepared and evaluated in accordance with the same procedures as those conducted in Example 6 except that no layer for receiving prints was formed on the cushion sheet.

The results of Examples 6 to 8 and Comparative Example 2 are shown in Table 2.

TABLE 2

|  | Cushion sheet | | Layer for receiving prints | Barrier layer |
|---|---|---|---|---|
|  | material | density (g/cm$^3$) |  |  |
| Example 6 | pulp (NBKP) pulp (LBKP) | 0.55 | clay coat | polyethylene |
| Example 7 | pulp (NBKP) polyester fiber | 0.28 | polyester urethane resin | polyethylene |
| Example 8 | pulp (NBKP) polyester fiber | 0.50 | polyester urethane resin | polyethylene |
| Comparative Example 2 | pulp (NBKP) | 0.70 | none | polyethylene |

| | Cushion material | | Cushion label | | | | |
|---|---|---|---|---|---|---|---|
| | stiffness (mN/100) | number of penetration of ink | adhesive strength (N/25 mm) average | adhesive strength (N/25 mm) standard deviation | clearness of character | number of fractured bottles | number of lifting & peeling |
| Example 6 | 254 | 0 | 12 | 2 | clear | 0 | 0 |
| Example 7 | 291 | 0 | 12 | 2 | clear | 0 | 0 |
| Example 8 | 142 | 0 | 12 | 2 | clear | 0 | 0 |
| Comparative Example 2 | 81 | 0 | 12 | 2 | obscure | 7 | 0 |

As shown in Table 2, the cushion labels of Examples 6 to 8 which were prepared by using the cushion materials having the barrier layer and stiffnesses of 291 mN/100 or smaller had great adhesive strengths, showed small fluctuation and caused no lifting or peeling from the vial bottles. The cushion material of the present invention exhibited the excellent printing property since the layer for receiving prints was formed on the cushion sheet. The cushion label of Comparative Example 2 which was prepared by using the cushion sheet having a density of 0.70 g/cm$^3$ and had no layer for receiving prints showed obscure printed characters and caused fracture of the vial bottles in the shaking test.

What is claimed is:

1. A cushion material which consists essentially of (a) a cushion sheet made of a mixed paper consisting essentially of 20 to 100% by weight of a synthetic fiber and 0 to 80% by weight of pulp and having a density of 0.05 to 0.65 g/cm$^3$ and (b) a layer for receiving prints disposed on a face of the cushion sheet, the cushion material optionally containing at least one of (i) a barrier layer disposed on a face of the cushion sheet which is opposite to a face of the cushion sheet which adjoins the layer for receiving prints and (ii) an under layer disposed between the cushion sheet and the layer for receiving prints.

2. A cushion material according to claim 1, wherein the cushion sheet is a mixed paper consisting essentially of 20 to 85% by weight of a synthetic fiber and 15 to 80% by weight of pulp.

3. A cushion material according to claim 1, wherein the synthetic fiber is a bulky yarn.

4. A cushion material according to claim 3, wherein the bulky yarn is made of a polyester fiber.

5. A cushion material according to claim 1, which contains the barrier layer which is disposed on a face of the cushion sheet opposite to a face of the cushion sheet which adjoins the layer for receiving prints; the cushion material having a stiffness of 400 mN/100 or smaller as measured in accordance with a method of TAPPI T543 pm-84.

6. A cushion material according to claim 1, which contains the under layer which is disposed between the cushion sheet and the layer for receiving prints.

7. A cushion material according to claim 5, wherein the barrier layer has resistance to solvents.

8. A cushion label which comprises a cushion material described in claim 1, an adhesive layer laminated to a face of the cushion material opposite to an outer face of the layer for receiving prints and a release material laminated to a face of the adhesive layer.

9. A cushion label which comprises a cushion material described in claim 3, an adhesive layer laminated to a face of the cushion material opposite to an outer face of the layer for receiving prints and a release material laminated to a face of the adhesive layer.

10. A cushion label which comprises a cushion material described in claim 4, an adhesive layer laminated to a face of the cushion material opposite to an outer face of the layer for receiving prints and a release material laminated to a face of the adhesive layer.

11. A cushion label which comprises a cushion material described in claim 5, an adhesive layer laminated to a face of the cushion material opposite to an outer face of the layer for receiving prints and a release material laminated to a face of the adhesive layer.

12. A cushion label which comprises a cushion material described in claim 6, an adhesive layer laminated to a face of the cushion material opposite to an outer face of the layer for receiving prints and a release material laminated to a face of the adhesive layer.

13. A cushion label which comprises a cushion material described in claim 7, an adhesive layer laminated to a face of the cushion material opposite to an outer face of the layer for receiving prints and a release material laminated to a face of the adhesive layer.

14. A cushion material according to claim 5, which contains the under layer which is disposed between the cushion sheet and the layer for receiving prints.

15. A glass bottle on the surface of which the label as set forth in claim 14 is adhered in a manner such that the label is placed around approximately the entire circumference of a trunk portion of the bottle.

16. A cushion material which consists essentially of (a) a cushion sheet made of a foamed plastic and having a density of 0.05 to 0.65 g/cm$^3$ and (b) a layer for receiving prints disposed on a face of the cushion sheet, and the cushion material optionally containing at least one of (i) a barrier layer disposed on a face of the cushion sheet which is opposite to a face of the cushion sheet which adjoins the layer for receiving prints and (ii) an under layer disposed between the cushion sheet and the layer for receiving prints.

17. A cushion material according to claim 16, which contains (i) the under layer which is disposed between the cushion sheet and the layer for receiving prints and (ii) the barrier layer which is disposed on a face of the cushion sheet opposite to the face of the layer for receiving prints, the barrier layer having resistance to solvent; the cushion material having a stiffness of 40 mN/100 or smaller, as measured in accordance with a method of TAPPI T543 pm-84.

18. A cushion label which comprises a cushion material set forth in claim 17, an adhesive layer laminated to a face of the cushion material opposite to the face of the layer for receiving prints and a release material laminated to a face of the adhesive layer.

19. A cushion material according to claim 1, wherein the density is 0.15 to 0.55 g/cm$^3$; the cushion sheet has a thickness of 100 to 350 μm; the cushion sheet has a basis weight of 50 to 150 g/m$^2$; the layer for receiving prints is formed by melt extrusion and laminating polyethylene resin and has a thickness of 10 to 75 μm; and the synthetic fiber has a length of 2 to 15 μm.

20. A cushion label which comprises (a) a cushion material as set forth in claim 19, the cushion material containing the barrier layer which is disposed on a face of the cushion sheet opposite to a face of the layer for receiving prints, the barrier layer having resistance to solvents, (b) an adhesive layer laminated to a face of the barrier layer and (c) a release material laminated to a face of the adhesive layer, the cushion material having a stiffness of 400 mN/100 or smaller as measured in accordance with a method of TAPPI T 543 pm.84.

* * * * *